US009191908B2

(12) United States Patent
Aldana et al.

(10) Patent No.: US 9,191,908 B2
(45) Date of Patent: Nov. 17, 2015

(54) REDUCING IMPACT OF CLOCK DRIFT IN WIRELESS DEVICES

(71) Applicant: QUALCOMM Incorporated, San Diego, CA (US)

(72) Inventors: Carlos Horacio Aldana, Mountain View, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/185,660

(22) Filed: Feb. 20, 2014

(65) Prior Publication Data
US 2014/0254511 A1    Sep. 11, 2014

Related U.S. Application Data (60) Provisional application No. 61/772,933, filed on Mar. 5, 2013.

(51) Int. Cl.
*H04W 56/00*    (2009.01)
(52) U.S. Cl.
CPC ........ *H04W 56/0035* (2013.01); *H04W 56/003* (2013.01)
(58) Field of Classification Search
CPC ............. H04L 47/283; H04W 56/003; H04W 56/0035
USPC ........................... 370/254–350; 709/201–213
See application file for complete search history.

(56) References Cited

U.S. PATENT DOCUMENTS

| 5,802,106 A | 9/1998 | Packer |
| 7,953,022 B2* | 5/2011 | Chun et al. ..................... 370/252 |
| 8,350,756 B2* | 1/2013 | Thomson et al. ........ 342/357.46 |
| 8,391,870 B1 | 3/2013 | Singh et al. |
| 8,441,943 B2* | 5/2013 | Kyusojin et al. .............. 370/248 |
| 8,489,114 B2* | 7/2013 | Zhang et al. ............... 455/456.1 |
| 2008/0225795 A1 | 9/2008 | Sun et al. |
| 2011/0149730 A1 | 6/2011 | Nemeth et al. |
| 2012/0281562 A1 | 11/2012 | Holmer |

FOREIGN PATENT DOCUMENTS

| EP | 1802014 A1 | 6/2007 |
| EP | 2375834 A2 | 10/2011 |

OTHER PUBLICATIONS

International Search Report and Written Opinion—PCT/US2014/017759—ISA/EPO—Sep. 3, 2014.

* cited by examiner

*Primary Examiner* — Ayaz Sheikh
*Assistant Examiner* — Debebe Asefa
(74) *Attorney, Agent, or Firm* — Berkeley Law & Technology Group, LLP (57) ABSTRACT

Systems and methods for calculating round trip time (RTT) between two wireless devices with respective clock drifts, while lowering the impact of the clock drifts on the RTT. A first RTT in a first direction is determined between a first wireless device and a second wireless device based on a first set of one or more messages exchanged between the first wireless device and the second wireless device. A second RTT in a second direction is determined between the second wireless device and the first wireless device based on a second set of one or more messages exchanged between the second wireless device and the first wireless device, and an average RTT of the first RTT and the second RTT is computed, wherein the average RTT has a low impact of the clock drifts.

34 Claims, 4 Drawing Sheets

REDUCING IMPACT OF CLOCK DRIFT IN WIRELESS DEVICES

CROSS-REFERENCE TO RELATED APPLICATION

The present application for patent claims the benefit of U.S. Provisional Application No. 61/772,933, entitled "REDUCING IMPACT OF CLOCK DRIFT IN WIRELESS DEVICES," filed Mar. 5, 2013, assigned to the assignee hereof, and expressly incorporated herein by reference in its entirety.

FIELD OF DISCLOSURE

Disclosed embodiments are directed to improving precision in positioning and location based applications. More particularly, exemplary embodiments are directed to reduction of the effect of clock drift in wireless devices configured according to IEEE 802.11 standards in order to enhance precision and reduce error in wireless communication systems.

BACKGROUND

Wireless communication systems can include wireless devices and access points (APs). The wireless devices can be configured as mobile stations (STAs) which can communicate between one another or through the APs. Standards such as IEEE 802.11ac, 802.11ad, 802.11v, etc are commonly used for such communications. These standards can include error specifications to ensure quality of communication.

An STA can include at least one local clock, based on which the STA bases its communication and data processing. However, it is usually not possible to precisely synchronize the local clocks among the several STAs, and therefore, each local clock can have its own error or clock drift. In positioning or location based applications using an 802.11 standard, determination of round trip time (RTT) for pre-specified messages or dialogs between two STAs for example can be used to provide an indication of distance between the two STAs. In a conventional method of RTT determination, when a transmitting STA, for example, is communicating with a receiving STA, the error in the transmitting STA's local clock gets compounded with the error in the receiving STA's local clock. Thus, the RTT determination and corresponding computation of distance between the two STAs is imprecise and highly error prone. The resultant error may be unacceptably high according to the wireless communication standard.

SUMMARY

Exemplary embodiments are directed to systems and methods for calculating round trip time (RTT) between two wireless devices with respective clock drifts, while lowering the impact of the clock drifts on the RTT. A first RTT in a first direction is determined between a first wireless device and a second wireless device based on a first set of one or more messages exchanged between the first wireless device and the second wireless device. A second RTT in a second direction is determined between the second wireless device and the first wireless device based on a second set of one or more messages exchanged between the second wireless device and the first wireless device, and an average RTT of the first RTT and the second RTT is computed, wherein the average RTT has a low impact of the clock drifts.

For example, an exemplary embodiment is directed to a method of calculating round trip time (RTT), at a first wireless device, from the first wireless device to a second wireless device, the method comprising: receiving a calculation of a first RTT in a first direction, based on a first set of one or more messages, wherein the first set of one or more messages comprises a first frame transmitted by the first wireless device in the first direction, calculating a second RTT in a second direction, based on a second set of one or more messages, wherein the second set of one or more messages comprises a second frame transmitted by the second wireless device in the second direction, and calculating an average RTT, wherein the average RTT is based on the first RTT and the second RTT.

Another exemplary embodiment is directed to a method of determining round trip time (RTT) at a first wireless devices, the method comprising: receiving a second clock error of a second clock of a second wireless device, locking a first clock of the first wireless device to the second clock based on the second clock error, and determining a round trip time based on the locked first clock.

Another exemplary embodiment is directed to a method of wireless communication by a wireless device, the method comprising: receiving two or more clock errors corresponding to two or more access points, wherein the two or more clock errors are broadcasted by the corresponding two or more access points, determining a smallest clock error of the two or more clock errors, and establishing communication with an access point corresponding to the smallest clock error, by synchronizing a clock of the wireless device based on the smallest clock error.

Another exemplary embodiment is directed to a first wireless device comprising: a first transmitter configured to transmit a first frame in a first direction, a first receiver configured to receive a calculation of a first round trip time (RTT) in the first direction, based on a first set of one or more messages comprising the transmitted first frame, and a first processor configured to: calculate a second RTT in a second direction, based on a second set of one or more messages, and calculate an average of the first RTT and the second RTT.

Another exemplary embodiment is directed to a first wireless device comprising: means for receiving a calculation of a first round trip time (RTT) between the first wireless device and a second wireless device, in a first direction, based on a first set of one or more messages, the first set of one or more messages comprises a first frame transmitted by the first wireless device in the first direction, means for calculating a second RTT between the first wireless device and the second wireless device, in a second direction, based on a second set of one or more messages, wherein the second set of one or more messages comprises a second frame transmitted by the second wireless device in the second direction, and means for calculating an average RTT, wherein the average RTT is based on the first RTT and the second RTT.

Yet another exemplary embodiment is directed to non-transitory computer-readable storage medium comprising code, which, when executed by a processor, causes the processor to perform operations for calculating round trip time (RTT), at a first wireless device, from the first wireless device to a second wireless device, the non-transitory computer-readable storage medium comprising: code for receiving a calculation of a first RTT in a first direction, based on a first set of one or more messages, wherein the first set of one or more messages comprises a first frame transmitted by the first wireless device in the first direction, code for calculating a second RTT in a second direction, based on a second set of one or more messages, wherein the second set of one or more messages comprises a second frame transmitted by the second wireless device in the second direction, and code for calculating an average RTT, wherein the average RTT is based on the first RTT and the second RTT.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, this sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are directed to systems and methods for reduction of clock drift in wireless communication systems. In some embodiments, wireless devices in an exemplary communication system can be configured to determine their clock drift and announce or broadcast it to other wireless devices or access points. Using knowledge of clock drift of the wireless devices in communication, exemplary techniques can reduce the resultant error in round trip time (RTT) calculations. In one example, a receiving device or STA can estimate its clock drift in terms of a clock drift of a sending STA, wherein the sending STA transmits or broadcasts the sending STA's clock drift. In another example, the converse is possible, whereby the receiving STA transmits or broadcasts the receiving STA's clock drift and the sending STA estimates the sending STA's clock drift in terms of the receiving STA's clock drift. In yet another example, either the sending or receiving STA or any other entity such as an access point can obtain the clock drifts of both the sending and the receiving STAs and using exemplary averaging functions, can obtain a highly accurate RTT between the sending and receiving STAs.

As used herein, an "access point" (or "AP") may refer to any device capable of and/or configured to route, connect, share, and/or otherwise provide a network connection to one or more other devices, such as wireless devices or STAs. An AP may include one or more wired and/or wireless interfaces, such as one or more Ethernet interfaces and/or one or more IEEE 802.11 interfaces, respectively, via which such a connection may be provided. For example, an AP, such as a wireless router, may include one or more Ethernet ports to connect to a local modem or other network components (e.g., switches, gateways, etc.) and/or to connect to one or more other devices to which network access is to be provided, as well as one or more antennas and/or wireless networking cards to broadcast, transmit, and/or otherwise provide one or more wireless signals to facilitate connectivity with one or more other devices.

A wireless device or STA, as described herein, can include a system, subscriber unit, subscriber station, mobile station, mobile, remote station, remote terminal, mobile device, user terminal, terminal, wireless communication device, user agent, user device, or user equipment (UE). An STA can be a cellular telephone, a cordless telephone, a session initiation protocol (SIP) phone, a wireless local loop (WLL) station, a personal digital assistant (PDA), a handheld device having wireless connection capability, computing device, or other processing device connected to a wireless modem.

In general, embodiments described herein may pertain to wireless communications for devices utilizing wireless local area networks (WLAN) according to various IEEE 802.11 messaging standards. Embodiments may improve on acquiring a position of an STA using wireless APs, for example, by reducing errors contributed by clock drift in the STAs towards calculation of RTTs. Rather than relying on satellite signals or assistance data from terrestrial base stations transmitting satellite geo-positioning data, STAs may acquire their geographic locations using wireless APs. The APs may transmit and receive wireless signals following various IEEE 802.11 standards, such as 802.11g, 802.11n, 802.11ac, 802.11ad, 802.11v, etc. In some embodiments, STAs may comply with 802.11ac and 802.11v standards while transmitting or receiving signals from multiple antennas. Some embodiments may sample timing signals in 0.1 nanosecond (ns) increments while some embodiments may sample signals in time increments of less than 10 ns, e.g. 1.5 ns, 2 ns, 0.1 ns, etc., while still complying with the standards. Embodiments may implement time of departure (TOD) and time of arrival (TOA)

measurements from 802.11 standards based on definitions that account for transmitted signals from multiple antennas. In some embodiments, the time difference between the TOA and TOD may be transmitted, rather than transmitting the TOA and TOD. In some embodiments, both receiving and sending STAs may transmit information sufficient to compute TOD and TOA measurements. In some embodiments, these new messages may be codified in revised 802.11 standards. The APs may transmit and receive timing measurements, such as TOA and TOD measurements, to and from the STAs. When an STA obtains timing measurements from three or more APs, along with geographical positioning information from the APs, the STA may be able to determine its location by performing techniques similar to GPS positioning, e.g. trilateration and the like, using the multiple timing measurements. In some cases (e.g., particularly when at least one of the STAs is stationary) the STAs may transmit and receive timing measurements between one another in order to obtain the RTT and the distance between one another.

Figure 1:
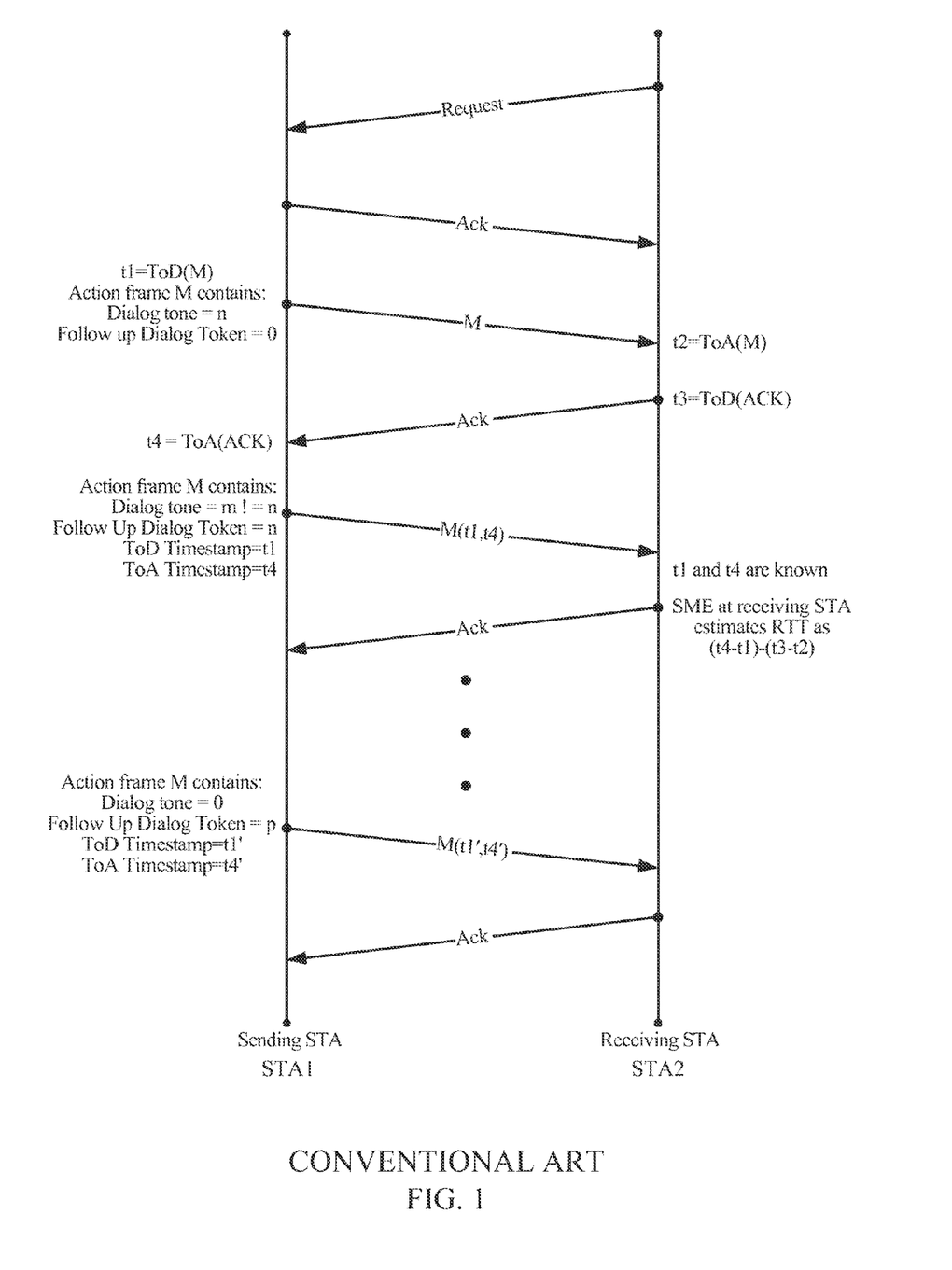
FIG. 1 is a timeline of message exchanges for calculation of RTT between two wireless devices in a conventional approach.

With reference to FIG. 1, an existing technique for computation of RTT between a sending STA (STA1) and a receiving STA (STA2) will be described, which may be consistent for example, with specifications, diagrams, and guidelines found in some 802.11 standards such as 802.11v at page 264. Following a request from STA2 and acknowledgment from STA1, STA1 transmits timing measurement frames in overlapping pairs. The first timing measurement frame of a pair contains a nonzero dialog token. The Dialog Token field is a non-zero value chosen by the sending STA to identify the timing measurement frame as the first of a pair, with the second or follow up timing measurement frame to be sent later (if the dialog token is zero it indicates that the timing measurement frame will not be followed by a subsequent follow up timing measurement frame). The follow up timing measurement frame contains a follow up dialog token set to the value of the dialog token in the first frame of the pair. With the first timing measurement frame, both STAs capture timestamps. STA1 captures a first time (t1) at which the timing measurement frame is transmitted. STA2 captures a second time (t2) at which the timing measurement frame arrives at STA2, and a third time (t3) at which the ACK response is transmitted from STA2. STA1 captures a fourth time (t4) at which the ACK arrives. In the follow up timing measurement frame, STA1 transfers the timestamp values it captured (t1 and t4) to STA2. With this information, STA2 may obtain the RTT as [(t4−t1)−(t3−t2)]. However, each of STA1 and STA2 are likely to have clock drifts in their local clocks, which will degrade the precision of the RTT obtained as above.

To illustrate, assume that the clock drift of a local clock in STA1 has an error, measured as a variation in parts per million (ppm) from the expected frequency, of ppm1. Similarly, STA2 has a local clock drift of ppm2. With reference again to FIG. 1, the various time stamps t1-t4 will be examined in further detail with the above assumptions. As seen, t2 is equal to t1 added to the time of flight (where TOF is half of RTT) of the timing measurement frame sent from STA1 to STA2, or in other words, t2=t1+TOF. The time t3 is obtained from adding the duration of the timing measurement frame (this duration will be referred to herein as "M") to the time it takes STA2 to respond to the message, also known as short inter frame spacing (SIFS), or in other words, t3=t2+M+SIFS. The time t4 is similarly obtained, as t3 added to the TOF, for the ACK from STA2 to STA1. In mathematical terms, t4=t3+TOF. Since STA1 can vary with an error of ppm1, the times t4 and t1 computed at STA1 will be multiplied by a factor of (1+ppm1). Similarly, the times t3 and t2 computed at STA2 will be multiplied by a factor of (1+ppm2). With the above breakdown of the times t1−t4, the RTT can be expressed in more detail with the following mathematical equations.

$$\begin{aligned}
RTT &= t4 - t1 - (t3 - t2) \\
&= (t3 + TOF - t1)*(1 + ppm1) - (t2 + M + SIFS - t2)*(1 + ppm2) \\
&= (t2 + M + SIFS + TOF - t1)*(1 + ppm1) - (M + SIFS)*(1 + ppm2) \\
&= (t1 + TOF + M + SIFS + TOF - t1)*(1 + ppm1) - (M + SIFS)* \\
&\quad (1 + ppm2) \\
&= (2*TOF + M + SIFS)*(1 + ppm1) - (M + SIFS)*(1 + ppm2) \\
&= 2*TOF*(1 + ppm1) + (M + SIFS)*(ppm1 - ppm2)
\end{aligned}$$

In a practical example wherein M is 100 us, SIFS is 16 us, and each of ppm1 and ppm2 are ±25 ppm, which brings ppm1−ppm2 to 50 ppm, it is seen that the error in RTT can be as high as 5.8 ns, which, can result in a position uncertainty of about 1.7 meters. In positioning applications, an error of such magnitude may be unacceptably large (particularly if STA1 and STA2 are close by). Accordingly, exemplary embodiments include systems and methods to reduce the error in RTT, as will be further explained in detail in the following sections.

Figure 2:
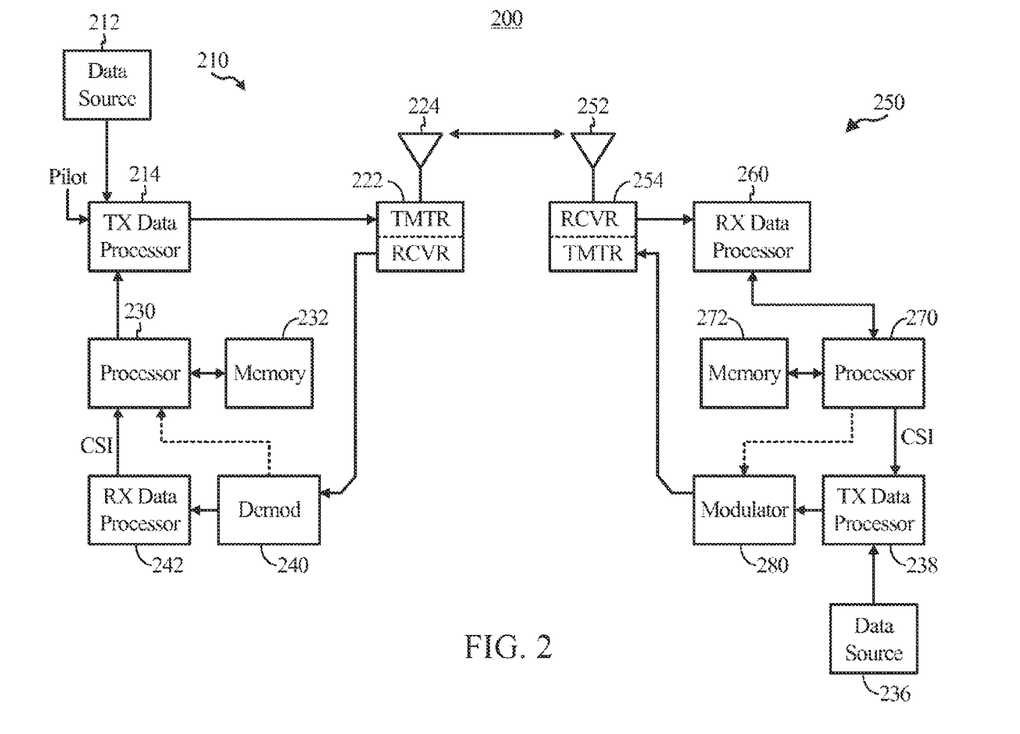
FIG. 2 illustrates an exemplary wireless communication system.

Firstly, with reference to FIG. 2, an exemplary system 200 will be described, which may be configured to perform the exemplary techniques for reducing the effect or impact of clock error in computation of RTT. As shown, system 200 includes a transmitter system 210 and a receiver system 250. Without loss of generality, both transmitter system 210 and receiver system 250 may be implemented in an AP or a STA. In illustrative examples, transmitter system 210 represents a sending STA or a first wireless device such as STA1 above, and receiver system 250 represents a receiving STA such as a second wireless device or STA2 above. Transmissions from transmitter system 210 to receiver system 250 are referred to as a forward link or a first direction, whereas transmissions from receiver system 250 to transmitter system 210 are referred to as a reverse link or a second direction.

It will be understood that some aspects of transmitter 210 and receiver system 250 have been configured to implement specific features, functions, and modifications as per exemplary embodiments. For example, transmitters and receivers configured to implement the current IEEE 802.11 standards typically include a plurality of data streams transmitted by a corresponding plurality of transmitters from the transmitter side in the forward link, which leads to ambiguities in fine timing measurement. Exemplary embodiments avoid these ambiguities and configure the transmitter system 210 and receiver system 250 to require all transmissions, for example, pertaining to frames for fine timing measurements, to occur from a single radio frequency (RF) chain or antenna. This aspect is implemented by transmission of traffic data from TX data processor 214 to transmitter 222 coupled to antenna 224 as will be further explained below.

For the first direction or forward link, data streams corresponding to all transmissions from transmitter system 210 are provided as traffic data from data source 212 to transmit (TX) data processor 214. TX data processor 214 performs formatting, coding, and interleaving of the traffic data based on an associated coding scheme. The coded traffic data can be multiplexed with pilot data using orthogonal frequency division multiplexing (OFDM) techniques. The pilot data is typically a known data pattern that is processed in a known manner and may be used at the receiver system to estimate the channel response. The multiplexed pilot and coded traffic data are modulated (e.g. according to BPSK, QPSK, etc) to provide modulation symbols which are then provided to a first transmitter shown as transmitter (TMTR) 222 for transmission through antenna 224. The data rate, coding, and modulation can be based on instructions stored in memory 232 and executed by processor 230.

At receiver system 250, the transmitted modulated signals are received by antenna 252 and the received signal is provided to receiver (RCVR) 254. Receiver 254 conditions (e.g., filters, amplifies, and down converts) the received signal, digitizes the conditioned signal to provide samples, and further processes the samples to provide a corresponding "received" symbol stream. RX data processor 260 then receives and processes the received symbol stream to provide a "detected" symbol stream. RX data processor 260 then demodulates, de-interleaves, and decodes the detected symbol stream to recover the traffic data. The processing by RX data processor 260 is complementary to that performed by TX data processor 214 at transmitter system 210.

Coming now to the second direction or reverse link, processor 270 at receiver system 250 periodically determines one of several pre-coding matrices stored in memory 272 and formulates a reverse link message comprising a corresponding matrix index portion and rank value portion. The reverse link transmissions or reverse link message may comprise various types of information regarding the communication link and/or the received traffic data. The reverse link message is processed by TX data processor 238, which also receives the traffic data from data source 236, modulated by modulator 280, conditioned by transmitter (TMTR) 254, and transmitted back to transmitter system 210. For the reverse transmission, the transmitter TMTR in receiver system 250 is shown in a same module as RCVR 254, sharing antenna 252, and similarly, a first receiver or receiver RCVR 222 in transmitter system 210 is shown in a same module as TMTR 222, sharing antenna 224.

At transmitter system 210, the modulated signals from receiver system 250 are received by antenna 224, conditioned by receiver 222, demodulated by demodulator 240, and processed by RX data processor 242 to extract the reverse link message. Processor 230 then determines which pre-coding matrix to use, from a plurality of pre-coding matrices stored in memory 232, and then processes the extracted message. While exemplary system 200 has been shown and described with regard to the illustrated features or functional blocks of FIG. 2, it will be understood that the functionalities of the various functional blocks can be combined or altered to suit particular implementations. For example, aspects related to TX data processor 214 and processor 230 of transmitter 210 may be combined and implemented in a first processor. Similar such modifications will be apparent to one skilled in the art.

Moreover, it will be understood that a further detailed description of the functionalities of the above description provides only a basic description of the functionality of the various above-mentioned components of system 200 have been omitted herein for the sake of clarity. A skilled person will be able to apply the disclosed techniques for fine timing measurement, as it relates to reducing the effect or impact of clock error in computation of RTT, to any other similar transmitter and receiver structure, without departing from the scope of this disclosure.

Figure 3:
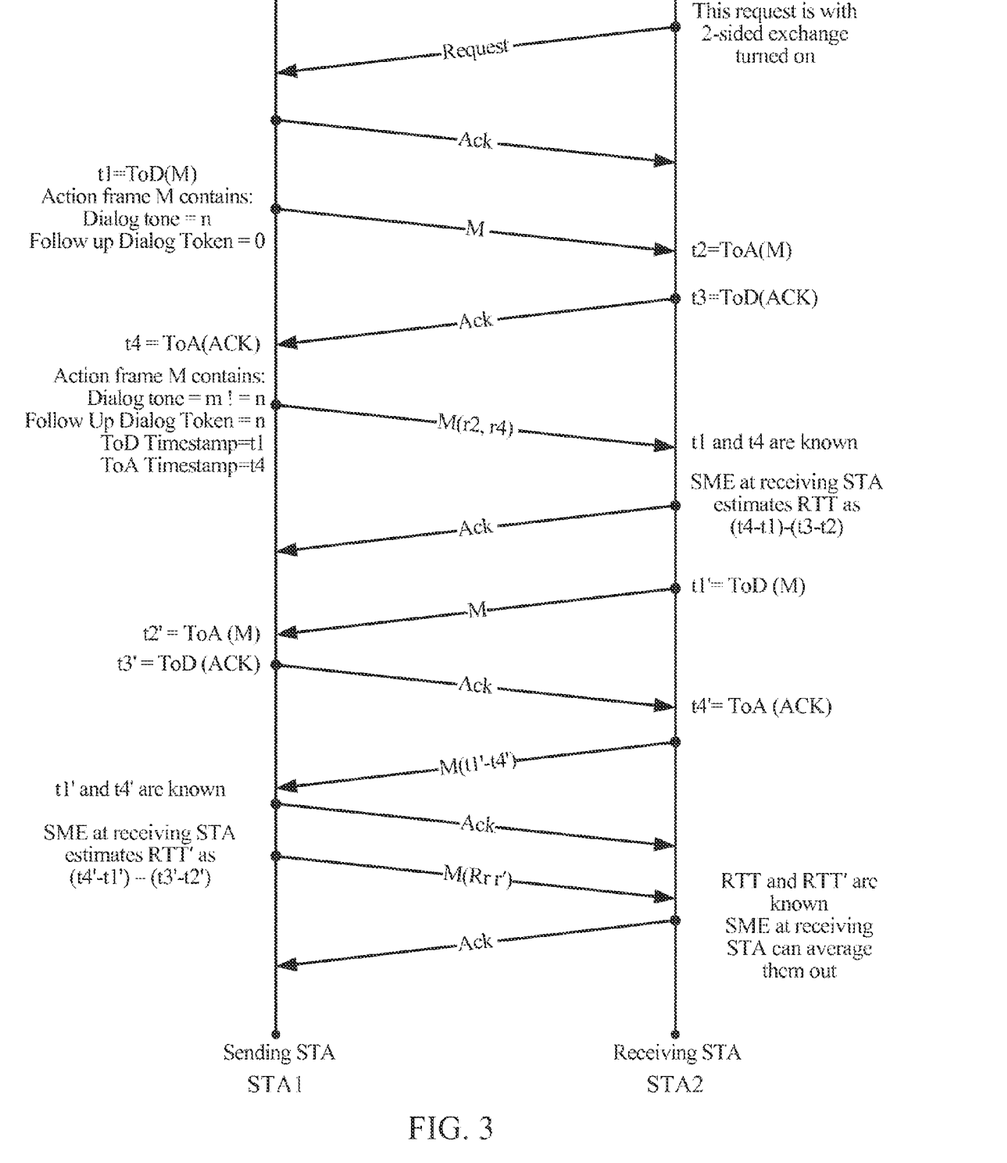
FIG. 3 illustrates an exemplary timeline of message exchanges for calculation of RTT between two wireless devices.

With reference now to FIG. 3, an exemplary embodiment pertaining to accurate measurement of RTT will be explained in further detail. In FIG. 3, STA1 may be configured according to transmitter system 210 of FIG. 2, while STA2 may be configured according to receiver system 250 of FIG. 2. In some embodiments, the system of FIG. 3 is configured for "fine timing measurement," whereby an accurate measurement of RTT between STA1 and STA2 may be obtained. As it pertains to this disclosure, fine timing measurement includes modifications to the current 802.11v standards. The current IEEE 802.11v standard can be used for synchronization purposes, as well as, for location or positioning purposes. With some of the modifications correspond to fine timing measurement, which have been shown in TABLE 1 below, the new IEEE 802.11 rev mc standard can be used for location purposes across various 802.11 standards (e.g., 802.11g, 802.11n, 802.11ac, 802.11ad, 802.11v, etc).

Table 1, as it pertains to aspects of the new IEEE 802.11 rev mc standard, relevant to exemplary embodiments, is shown below:

TABLE 1

Fine Timing Measurement

The current resolution of 10 ns for 802.11v is appropriate for signals that have CH_BANDWIDTH < 100 MHz. The signals of both 802.11ac (160 MHz) and 802.11ad (>1.8 GHz) have much greater requirements. To be future proof, a proposed modification according to fine timing measurement includes modifying the current resolution to 0.1 ns.
Current timing measurement frames and timing measurement request frames are class 3 frames that require both authentication and association. This is unnecessary. Accordingly, in the fine timing measurement, a modification includes adding new public action frames that have the same functionality as existing 802.11v frames, and since they are public action, these frames are class 1 frames. Class 1 frames do not require either authentication or association. The amount of overhead is minimal in typical scenarios. For example, when doing packet exchanges with 3 APs every 5 s, assuming 300 clients in the AP neighborhood, transmitting at a rate of 36 mbps, the amount of overhead is 300 * 3 * (68 us + 72 us + 72 us)/5 s = 3.8%.
The current wording in section 8.5.15.3 of IEEE 802.11v (Timing Measurement Frame Format) has a multi-antenna ambiguity. A proposed modification according to fine timing measurement includes removing this ambiguity in the new fine timing measurement frames and requiring all transmissions to occur from a single RF chain.
This modification has been illustrated in the exemplary system 200 of FIG. 2.

While Table 1 above summarizes relevant modifications to the current IEEE 802.11 standards to obtain the proposed new IEEE 802.11 rev mc standard, particularly as it relates to fine timing measurement in exemplary embodiments, further details of the proposed new IEEE 802.11 rev mc standard, in general, can be found in U.S. Provisional Application No. 61/721,437, entitled "METHODS FOR PRECISE LOCATION DETERMINATIONS AND WIRELESS TRANSMISSIONS IN 802.11 STANDARDS," filed Nov. 1, 2012, assigned to the assignee hereof, and incorporated by reference herein.

More particularly, with regard to the disclosed embodiments, fine timing measurement allows, for example, STA2 to accurately measure the RTT between STA2 and STA1. With the regular transfer of fine timing measurement frames it is possible for the receiving STA (STA2) to track changes in its relative location with other STAs in the environment.

As can be recognized, the timeline related to message transfers between STA1 and STA2 includes additional elements than those that were described with regard to the conventional approach in FIG. 1. More particularly, in the exemplary aspects of FIG. 3, the request from STA2 indicates that a two-sided exchange is turned on. This saves an additional request-acknowledgment routine between STA1 and STA2, however, it will be understood that alternative embodiments may be configured without the two-sided exchange, whereby the same result can be obtained, albeit through additional steps of request-acknowledgement. It will be understood that although the sequence of actions/routines have been illustrated in an exemplary order in FIG. 3, there is no requirement for embodiments to adopt the same sequence of actions. For example, even though an action may be described as following or being performed subsequent to a previous action, there is no requirement that an action and a previous action must be separated in time, as it is possible that some of the actions described in the timeline of FIG. 3 may be combined into a single transaction or performed simultaneously or concurrently, without diverging from the scope of the embodiments.

Proceeding with the timeline of FIG. 3, subsequent to the two-sided request from STA2 and acknowledgment from STA1, STA1 transmits timing measurement frames in overlapping pairs. The next few message transfers are similar to the conventional techniques, where a first RTT is calculated in a first direction. A first clock error, for example related to STA1, may be associated with the first RTT. Without loss of generality, the first direction relates to a round trip of timing measurement frames corresponding to a first frame, for example, which is transmitted from STA1 to STA2, followed by an acknowledgement of the first frame transmitted from STA2 to STA1. Thus, the first RTT in the first direction can be computed based on a first set of one or more messages, where the messages comprise the transmission (e.g., first transmission) of the first frame and reception of a corresponding acknowledgment (e.g., first acknowledgment) of the first frame. In more detail, as previously explained, the first RTT is based at least in part on the first and fourth times, t1 and t4, which may be obtained at STA1 related to RTT measurement of the first frame, for example. Once again, times t1 and t4 may be transferred to STA2, where STA2 can compute a first RTT in a first direction, or simply, "RTT" herein, in similar manner as explained above with respect to FIG. 1, i.e. by computing [(t4−t1)−(t3−t2)]. In some cases, STA2 can transfer the computed RTT to STA1.

Once STA2 receives t1 and t4 (and further, acknowledges this receipt and/or sends the computed RTT to STA1 in some cases), exemplary embodiments depart from conventional techniques, in that a second protocol for obtaining a second set of measurements, for a second RTT in a second direction (herein, RTT'), between STA2 and STA1 is commenced, where the second direction may be considered to be the reverse of the first direction. A second clock error, for example, corresponding to the second wireless device STA2 may be associated with the second RTT.

This second RTT in the second direction, or RTT', is computed based on a second set of one or more messages pertaining to transmission of a second frame and reception of an acknowledgment of the second frame. More specifically, STA2 transmits (e.g., in a second transmission) a timing measurement frame, pertaining to the second frame, for example, to STA1 at a fifth time (t1'). STA1 captures a sixth time (t2') at which the second frame arrives at STA1 and a seventh time (t3') at which the acknowledgement of the second frame (e.g., a second acknowledgment or ACK response), is transmitted from STA1. STA2 captures an eighth time (t4') at which the ACK is received at STA2. In the follow up timing measurement frame, STA2 transfers the timestamp values it captured (t1' and t4') to STA1. With this information, STA1 may be able to determine the second RTT as a difference between the eighth time and the fifth time, minus the difference between the seventh time and the sixth time, represented by the equation: RTT'=[(t4'−t1')−(t3'−t2')]. In one embodiment, as illustrated, STA1 can transfer the computed RTT' to STA2, whereby STA2 will possess both RTT and RTT'. Using this information, STA2 may obtain an average of RTT and RTT', denoted as RTT", which can advantageously lead to a significant reduction in error caused by clock drift. More specifically, an average clock error associated with the average RTT, (RTT") is lower error that than the first clock error associated with the first RTT (RTT) and the second clock error associated with the second RTT (RTT').

Alternatively, if STA2 had previously transferred RTT to STA1 as mentioned previously as an option for some embodiments, and since STA1 already possesses RTT', STA1 may also perform computations to obtain the average RTT" of RTT and RTT'. For the sake of explanation of an illustrative embodiment, the case where RTT" is calculated at STA2 is chosen below, while it will be kept in mind that this is a non-limiting illustration, and the below computation of RTT" may be performed at STA1, or for that matter, at any other entity, such as an access point to which the necessary time stamps and/or round trip time values are transferred from STA1 and STA2.

For the sake of brevity, the calculation of RTT' is provided with regard to an exemplary embodiment, while it is assumed that the calculation of RTT is similar to that in the conventional approach already described. It will be understood that STA1 and STA2 are assumed to be preferably stationary or non-mobile (or the distance between them remains unaltered) for the below calculations, so the TOF values do not change. Moreover, if identical systems or chipsets are used in the configuration of STA1 and STA2, which is often the case for handsets, the SIFS values for STA1 and STA2 will also be the same. With these assumptions, and keeping in mind that once again, STA1 is assumed to have a clock drift with an error of ppm1 and STA2 has a similar error of ppm2, the corresponding, RTT' is obtained as follows.

$$\begin{aligned} RTT' &= t4' - t1' - (t3' - t2') \\ &= (t3' + TOF - t1')*(1 + ppm2) - (t2' + M + SIFS - t2')* \\ & \quad (1 + ppm1) \\ &= (t2' + M + SIFS + TOF - t1')*(1 + ppm2) - (M + SIFS)* \\ & \quad (1 + ppm1) \\ &= (t1' + TOF + M + SIFS + TOF - t1')*(1 + ppm2) - (M + SIFS)* \\ & \quad (1 + ppm1) \\ &= (2*TOF + M + SIFS)*(1 + ppm2) - (M + SIFS)*(1 + ppm1) \\ &= 2*TOF*(1 + ppm2) + (M + SIFS)*(ppm2 - ppm1) \end{aligned}$$

As will be recalled, RTT is obtained as RTT=2*TOF*(1+ppm1)+(M+SIFS)*(ppm1−ppm2). Accordingly, averaging RTT and RTT' will result in an average, represented by $$\begin{aligned} RTT'' &= 2TOF*\left(1 + \frac{ppm1 + ppm2}{2}\right) \\ &= 2TOF + TOF*(ppm1 + ppm2) \end{aligned}$$

With the previous assumptions intact, i.e. M is 100 us, SIFS is 16 us, and each of ppm1 and ppm2 are ±25 ppm, it is seen that the error in RTT" corresponds to the factor TOF*(ppm1+ppm2) in the RTT" expression, which, when STA1 and STA2 are 100 meters apart equates to $100/3e8*1e9*50e^{-6}=0.0167$ ns. Compared to the 5.8 ns error in the conventional approach explained with regard to FIG. 1, it is seen that in exemplary embodiments, the error is reduced by a factor of 348, which will be recognized as a substantial reduction by those skilled in the art. Accordingly, by obtaining round trip time values using time frame measurement transfers in both directions between STA1 and STA2, and averaging them out, exemplary embodiments can minimize the impact of clock drift of the two STAs in the calculation of RTT, and thus improve the precision of the RTT.

While in the above illustrated example, STA1 computed RTT' and sent it to STA2 for the averaging functions, as previously explained, alternative embodiments are possible, wherein RTT computed at STA2 is sent to STA1; and since STA1 is already configured to compute RTT', STA1 may complete the steps for calculating the averaging function to determine RTT". As another alternative, both STA1 and STA2 may transfer some or all of the time stamps and round trip time computations to another entity such as, a server, a location determining entity, or an AP to determine RTT". For example, STA2 may compute and send RTT to an AP, and STA1 may compute and send RTT' to the AP, whereby the AP can compute RTT". Skilled persons will recognize various other alternatives which may be possible on similar lines, while keeping mind that obtaining RTT in both directions and averaging them can significantly reduce impact of clock drift in RTT computation.

Additionally, it will be noted that with fine timing measurements and corresponding timestamp capture described above, with regard to the computation of RTT for example, t1 and t3 correspond to the point in time at which the start of the preamble for the transmitted frame appears at the transmit antenna port (e.g. of antenna 224 coupled to transmitter TMTR 222, where STA1 is implemented as transmitter system 210). An implementation may capture a timestamp during the transmit processing earlier or later than the point at which it actually occurs and offset the value to compensate for the time difference. Correspondingly, t2 and t4 correspond to the point in time at which the start of the preamble for the incoming frame arrives at the receive antenna port (e.g. of antenna 252 coupled to receiver RCVR 254, where STA2 is implemented as receiver system 250). Because detecting the frame and synchronizing with its logical structure incurs a time delay, an implementation determines when the start of the preamble for the incoming frame arrived at the receive antenna port by capturing a timestamp some time after it occurred and compensating for the delay by subtracting an offset from the captured value.

Yet another embodiment will now be described, wherein, instead of averaging RTT and RTT' as above to obtain RTT", one of the two STAs, say STA2 can lock its clock on to that of STA1, so that the factor (1+ppm2) for STA2 would take the form of (1+ppm1−residual_ppm), wherein residual_ppm is a differential ppm2 remaining after STA2 has locked on to the clock of STA1. As one of skill in the art will understand, STA2 can lock its clock on to STA1's clock, for example, in a coarse manner during Legacy Short Training Field (L-STF) portion of the preamble of an IEEE 802.11 frame, and prior to the Legacy Long Training Field (L-LTF) portion. In this embodiment, the additional steps of computing RTT' and RTT" are not required. Therefore, computation of RTT which was previously described, will be suitably modified, as follows:

$$RTT = 2*TOF*(1 + ppm1) + (M + SIFS)*(ppm1 - ppm2)$$

$$= 2*TOF*(1 + ppm1) + (M + SIFS)*(\text{residual\_ppm})$$

In an illustrative example, if residual_ppm is assumed to be on the order of 1 ppm, which corresponds to practical applications, then the error in RTT is reduced to $116\ us*1e^{-6}= 0.116\ ns = 0.03\ m$, which is lower than the error in conventional approaches by a factor of about 50 (with the same assumptions as above, i.e. M is 100 us, SIFS is 16 us, each of ppm1 and ppm2 are ±25 ppm, and STA1 and STA2 are 100 meters).

In some embodiments, where the communication may relate to that between an AP and an STA (i.e., instead of between two STAs, STA1 and STA2 as discussed above), and a wireless communication system comprises several APs that are location enabled, then performance of the embodiment can be improved if the APs are configured to advertise or broadcast their maximum clock errors or ppm values. In this manner, all the STAs in the communication system may lock on to the AP with the lowest clock error. Moreover, in this example, the AP with the smallest clock error can serve as a master for its neighbors. Thus a wireless device such as STA1 or STA2, for example, may receive two or more clock errors transmitted by two or more access points, and determine a smallest clock error of the two or more clock errors. The wireless device may then establish communication with an access point corresponding to the smallest clock error, by synchronizing a clock of the wireless device based on the smallest clock error. The advertisement of the clock errors (e.g., in ppm) can be broadcast in a beacon or in a handshake process, such as fine timing measurement request exchange, which would normally happen before fine timing measurement exchange is performed. Further, the wireless device may also communicate to a smallest clock error AP which corresponds to the smallest clock error that the smallest clock error AP has the smallest clock error. Based on this, the smallest clock error AP may designate or establish itself as a master AP, and advertise its status as the master AP to neighboring APs.

Figure 4:
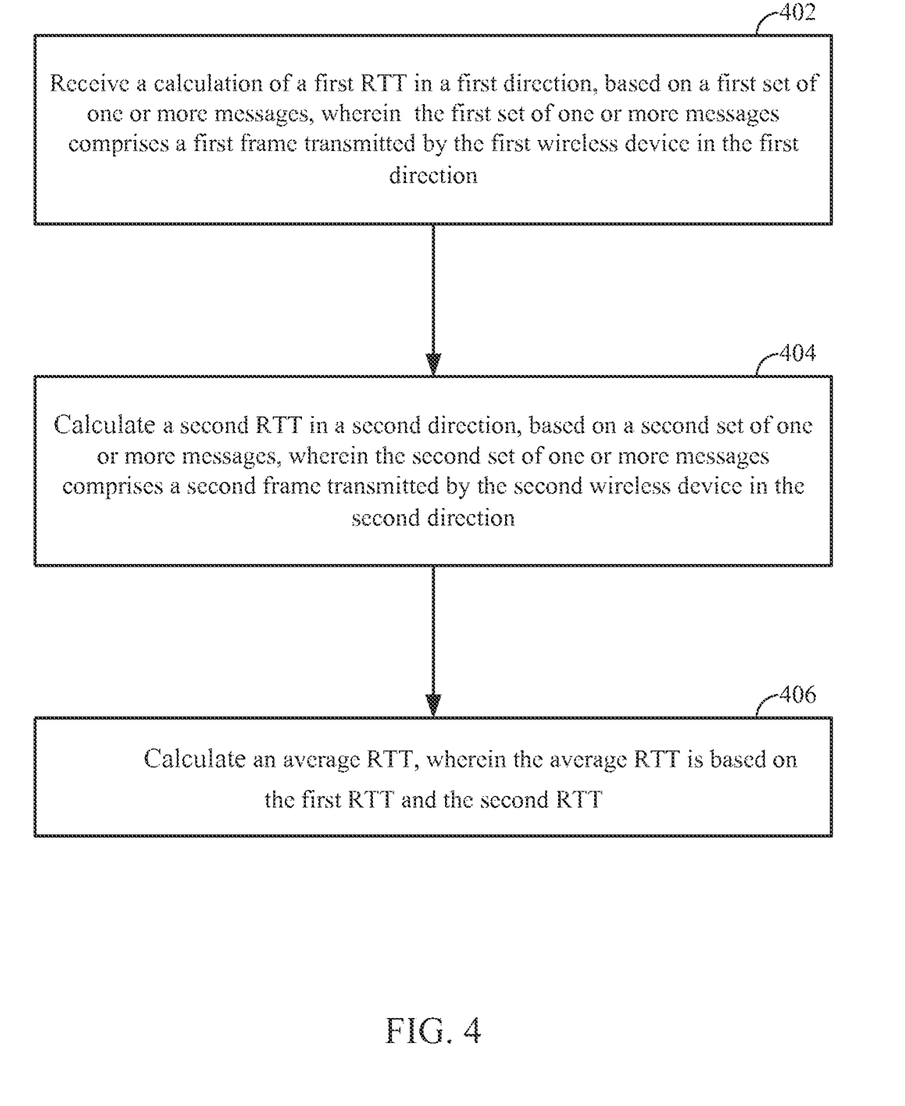
FIG. 4 illustrates a flow chart of sequences in an exemplary method of determining RTT between two wireless devices.

It will be appreciated that embodiments include various methods for performing the processes, functions and/or algorithms disclosed herein. For example, as illustrated in FIG. 4, an embodiment can include a method of method of calculating round trip time (RTT), at a first wireless device, from the first wireless device (e.g., STA1) to a second wireless device (e.g., STA2), the method comprising: receiving a calculation of a first RTT in a first direction (e.g., receiving RTT from STA2), based on a first set of one or more messages, wherein the first set of one or more messages comprises a first frame transmitted by the first wireless device in the first direction—Block 402; calculating a second RTT in a second direction (e.g. RTT'), based on a second set of one or more messages, wherein the second set of one or more messages comprises a second frame transmitted by the second wireless device in the second direction—Block 404; and calculating an average RTT (e.g., RTT"), wherein the average RTT is based on the first RTT and the second RTT—Block 406.

In some aspects, the first wireless device comprises a first clock error related to determination of the second RTT in the second direction, and the first RTT can be received from a second wireless device in the first direction, where the second wireless device comprises a second clock error. The average RTT has a lower error that than the first RTT or the second RTT. The first and second wireless devices may be mobile devices, or the first wireless device may be an access point, while the second wireless device is a mobile device or access terminal Additionally, the first and second set of messages may be based on an IEEE 802.11 standard, and particularly, may be based on fine timing measurement.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for reducing the impact of clock error/drift in determining RTT between two wireless devices. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, at a first wireless device, of computing an estimated location of the first wireless device, the method comprising:
    receiving a first round trip time (RTT) measurement computed based, at least in part, on one or more first values obtained from a first fine time measurement frame transmitted from a second wireless device, the one or more first values being based, at least in part, on a timestamp of a time of receipt of a first acknowledgement frame transmitted by the first wireless device and a timestamp of a time of transmission of the first fine time measurement frame;
    computing a second RTT measurement based, at least in part, on one or more second values obtained from a second fine time measurement frame transmitted from the first wireless device and a timestamp of a time of transmission of the second fine time measurement frame; and
    combining the first RTT measurement and the second RTT measurement to compute the estimated location of the first wireless device.

2. The method of claim 1, wherein the first acknowledgement frame is transmitted by the second wireless device, and wherein the second acknowledgement frame is transmitted by the second wireless device in response to receipt of a previous fine time measurement frame transmitted by the first wireless device.

3. The method of claim 1, wherein the first wireless device comprises a mobile device.

4. The method of claim 1, wherein the first wireless device comprises an access point.

5. A method of determining round trip time (RTT) at a first wireless devices, the method comprising:
    receiving a second clock error of a second clock of a second wireless device;
    locking a first clock of the first wireless device to the second clock based on the second clock error; and
    determining a round trip time based on the locked first clock.

6. A method of wireless communication by a wireless device, the method comprising:
    receiving two or more clock errors corresponding to two or more access points, wherein the two or more clock errors are broadcasted by the corresponding two or more access points;
    determining a smallest clock error of the two or more clock errors; and
    establishing communication with an access point corresponding to the smallest clock error, by synchronizing a clock of the wireless device based on the smallest clock error.

7. The method of claim 6, wherein receiving the two or more clock errors further comprises a fine timing measurement request exchange between the wireless device and the corresponding two or more access points.

8. The method of claim 6, wherein the two or more clock errors are maximum clock errors of the corresponding two or more access points.

9. The method of claim 6, wherein the access point corresponding to the smallest clock error is configured to establish itself as a master access point of the two or more access points.

10. A first wireless device comprising:
    a transmitter to transmit frames in a communication network;
    a receiver to receive frames from the communication network; and
    a processor configured to:
        obtain a first round trip time (RTT) measurement received at the receiver, the first RTT measurement being computed based, at least in part, on one or more first values obtained from a first fine time measurement frame transmitted from a second wireless device, the one or more values being based, at least in part, on a timestamp of a time of receipt of a first acknowledgement frame transmitted by the first wireless device and a timestamp of a time of transmission of the first fine time measurement frame;
        compute a second RTT measurement based, at least in part, on one or more second values obtained from a second fine time measurement frame transmitted from the first wireless device, the one or more second values being based, at least in part, on a timestamp of a time of receipt of a second acknowledgement frame received at the receiver, the second acknowledgement frame being transmitted by the second wireless device, and a timestamp of a time of transmission of the second fine time measurement frame; and combine the first RTT measurement and the second RTT measurement to compute the estimated location of the first wireless device.

11. The first wireless device of claim 10 wherein the first acknowledgement frame is transmitted by the second wireless device, and wherein the second acknowledgement frame is transmitted by the second wireless device in response to receipt of a previous fine time measurement frame transmitted by the first wireless device.

12. The first wireless device of claim 10, wherein the first wireless device comprises integrated on a mobile device.

13. The first wireless device of claim 10, wherein the first wireless device comprises integrated on an access point.

14. A first wireless device comprising:
means for receiving a first round trip time (RTT) measurement between the first wireless device and a second wireless device computed based, at least in part, on one or more first values obtained from a first fine time measurement frame transmitted from a second wireless device, the one or more first values being based, at least in part, on a timestamp of a time or receipt of a first acknowledgement frame transmitted by the first wireless device and a timestamp of a time of transmission of the first fine time measurement frame;
means for computing a second RTT measurement between the first wireless device and the second wireless device based, at least in part, on one or more second values obtained from a second fine time measurement frame transmitted from the first wireless device and a timestamp of a time of transmission of the second fine time measurement frame; and
means for combining the first RTT measurement and the second RTT measurement to compute an estimated location of the first wireless device.

15. The first wireless device of claim 14, wherein the first acknowledgement frame is transmitted by the second wireless device, and wherein the second acknowledgement frame is transmitted by the second wireless device in response to receipt of a previous fine time measurement frame transmitted by the first wireless device.

16. A non-transitory computer-readable storage medium comprising code, which executable by a processor to perform operations for estimating a location of a first wireless device, the non-transitory computer-readable storage medium comprising:
code to obtain a calculation of a first round trip time (RTT) measurement based, at least in part, on one or more first values obtained from a first time measurement frame transmitted from a second wireless device, the one or more first values being based, at least in part, on a timestamp of a time of receipt of a first acknowledgement frame transmitted by the first wireless device and a timestamp of a time of transmission of the first fine time measurement frame;
code to compute a second RTT measurement based, at least in part, on one or more second values obtained from a second fine time measurement frame transmitted from the first wireless device and a timestamp of a time of transmission of the second fine time measurement frame; and code to combine the first RTT measurement and the second RTT measurement to compute an estimated location of the first wireless device.

17. The non-transitory computer-readable storage medium of claim 16, wherein the first acknowledgement frame is transmitted by the second wireless device, and wherein the second acknowledgement frame is transmitted by the second wireless device in response to receipt of a previous fine time measurement frame transmitted by the first wireless device.

18. The method of claim 1, wherein combining the first RTT measurement and the second RTT measurement comprises combining the first RTT measurement and the second RTT measurement to provide a third RTT measurement reducing an effect of clock drift error attributed to the first wireless device and the second wireless device.

19. The method of claim 18, wherein a first clock error is associated with the first RTT measurement and a second clock error is associated with the second RTT measurement, and wherein a third clock error associated with the third RTT measurement is smaller than the first clock error and the second clock error.

20. The first wireless device of claim 10, wherein the processor is further configured to combine the first RTT measurement and the second RTT measurement by computing an average of the first RTT measurement and the second RTT measurement.

21. The method of claim 3, wherein the second wireless device comprises an access point.

22. The first wireless device of claim 10, wherein the processor is further configured to combine the first RTT measurement and the second RTT measurement by combining the first RTT measurement and the second RTT measurement to provide a third RTT measurement reducing an effect of clock drift error attributed to the first wireless device and the second wireless device.

23. The first wireless device of claim 21, wherein a first clock error is associated with the first RTT measurement and a second clock error is associated with the second RTT measurement, and wherein a third clock error associated with the third RTT measurement is smaller than the first clock error and the second clock error.

24. The first wireless device of claim 14, wherein the means for combining the first RTT measurement and the second RTT measurement further comprises means for combining the first RTT measurement and the second RTT measurement to provide a third RTT measurement reducing an effect of clock drift error attributed to the first wireless device and the second wireless device.

25. The first wireless device of claim 24, wherein a first clock error is associated with the first RTT measurement and a second clock error is associated with the second RTT measurement, and wherein a third clock error associated with the third RTT measurement is smaller than the first clock error and the second clock error.

26. The first wireless device of claim 14, wherein the means for combining the first RTT measurement and the second RTT measurement comprises means for computing an average of the first RTT measurement and the second RTT measurement.

27. The method of claim 3, wherein the second wireless device comprises an access point.

28. The non-transitory computer-readable storage medium of claim 16, the non-transitory computer-readable storage medium further comprising code to combine the first RTT measurement and the second RTT measurement by computing an average of the first RTT measurement and the second RTT measurement.

29. The non-transitory computer-readable storage medium of claim 16, wherein the first wireless device comprises an access point.

30. The non-transitory computer-readable storage medium of claim 16, wherein the first wireless device comprises a mobile device.

31. The non-transitory computer-readable storage medium of claim 16, the non-transitory computer-readable storage medium further comprising code to combine the first RTT measurement and the second RTT measurement by computing an average of the first RTT measurement and the second RTT measurement.

32. The non-transitory computer-readable storage medium of claim 16, the non-transitory computer-readable storage medium further comprising code to combine the first RTT measurement and the second RTT measurement by combining the first RTT measurement and the second RTT measurement to provide a third RTT measurement reducing an effect of clock drift error attributed to the first wireless device and the second wireless device.

33. The non-transitory computer-readable storage medium of claim 32, wherein a first clock error is associated with the first RTT measurement and a second clock error is associated with the second RTT measurement, and wherein a third clock error associated with the third RTT measurement is smaller than the first clock error and the second clock error.

34. The non-transitory computer-readable storage medium of claim 16, the non-transitory computer-readable storage medium further comprising code to combine the first RTT measurement and the second RTT measurement by computing an average of the first RTT measurement and the second RTT measurement.

* * * * *